(12) United States Patent
Kim et al.

(10) Patent No.: US 9,851,488 B2
(45) Date of Patent: Dec. 26, 2017

(54) LIGHT GUIDE PLATE AND BACKLIGHT UNIT INCLUDING THE SAME

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Yangju-si (KR)

( * ) Notice: Subject to any disclaimer, the term of this patent is extended or adjusted under 35 U.S.C. 154(b) by 157 days.

(21) Appl. No.: 14/828,713

(22) Filed: Aug. 18, 2015

(65) Prior Publication Data

US 2016/0047964 A1    Feb. 18, 2016

Related U.S. Application Data

(60) Provisional application No. 62/038,723, filed on Aug. 18, 2014.

(30) Foreign Application Priority Data

Mar. 31, 2015  (KR) .................. 10-2015-0045743
Mar. 31, 2015  (KR) .................. 10-2015-0045744

(51) Int. Cl.
*F21V 8/00* (2006.01)

(52) U.S. Cl.
CPC ........... *G02B 6/002* (2013.01); *G02B 6/0016* (2013.01)

(58) Field of Classification Search
CPC . F21Y 2103/10; G02B 6/0001; G02B 6/0013; G02B 6/0016; G02B 6/002; G02B 6/0031; G02B 6/0036; G02B 6/0055; G02B 6/0073; G02B 6/0091; G02B 6/0046; G02B 6/0011; G02B 6/0023; G02B 6/0028; G02B 6/4298; G02B 6/0068; G02F 1/133615; G02F 2001/133603

See application file for complete search history.

(56) References Cited

U.S. PATENT DOCUMENTS

| | | | | |
|---|---|---|---|---|
| 7,018,087 B2* | 3/2006 | Yoo | ...... | G02B 6/0046 362/610 |
| 7,182,499 B2* | 2/2007 | Chen | ...... | G02B 6/002 362/607 |
| 7,604,388 B2* | 10/2009 | Nishio | ...... | G02B 6/0016 362/558 |
| 7,938,568 B2* | 5/2011 | Bu | ...... | G02B 6/0025 362/621 |
| 8,210,730 B2* | 7/2012 | Kurata | ...... | G02B 6/0021 362/606 |

(Continued)

*Primary Examiner* — Hargobind S Sawhney

(57) ABSTRACT

Disclosed are a light guide plate and a backlight unit including the same. The light guide plate includes: a light guide plate including: a light output surface for outputting light to the outside; a reflective surface which is located in the opposite side of the light guide plate; and a light incident surface which is provided in at least one side surface among side surfaces connecting the light output surface and the reflective surface, and to which the light emitted from a light source is incident. A flat portion having a constant thickness is provided in a space which is spaced apart from the light incident surface, and a light input portion is formed in a space between the light incident surface and the flat portion, and a thickness of the light input portion is changed in a greater range than that of the flat portion.

19 Claims, 14 Drawing Sheets

(56) References Cited

U.S. PATENT DOCUMENTS

| | | | | |
|---|---|---|---|---|
| 8,251,564 B2 * | 8/2012 | Lin | | G02B 6/0016 362/606 |
| 8,310,620 B2 * | 11/2012 | Yabe | | G02B 6/002 349/61 |
| 8,556,493 B2 * | 10/2013 | Suma | | G02B 6/0016 362/621 |
| 8,613,541 B2 * | 12/2013 | Yu | | 362/612 |
| 8,684,588 B2 * | 4/2014 | Ajichi | | G02B 6/0036 362/23.09 |
| 8,814,412 B2 * | 8/2014 | Yabe | | G02B 6/002 362/606 |
| 8,827,530 B2 * | 9/2014 | Chang | | G02B 6/0028 362/608 |
| 8,827,532 B2 * | 9/2014 | Wang | | G02B 6/0053 362/625 |
| 8,845,170 B2 * | 9/2014 | Kim | | G02B 6/003 362/608 |
| 8,882,328 B2 * | 11/2014 | Kinder | | G02B 6/0028 362/615 |
| 8,894,266 B2 * | 11/2014 | Ye | | G02B 6/002 362/609 |
| 8,899,816 B2 * | 12/2014 | Lin | | F21S 8/00 362/610 |
| 8,939,633 B2 * | 1/2015 | Yabe | | G02B 6/0028 362/620 |
| 9,128,224 B2 * | 9/2015 | Kurata | | G02B 6/0016 |
| 9,158,056 B2 * | 10/2015 | Takada | | G02B 6/0068 |
| 9,453,956 B2 * | 9/2016 | Wu | | G02B 6/002 |
| 9,535,204 B2 * | 1/2017 | Kunimochi | | G02B 6/0046 |
| 2004/0109306 A1 * | 6/2004 | Lee | | G02B 6/002 362/615 |
| 2006/0203511 A1 * | 9/2006 | Tseng | | G02B 6/0016 362/608 |
| 2007/0133228 A1 * | 6/2007 | Chen | | G02B 6/0071 362/621 |
| 2007/0147074 A1 * | 6/2007 | Sakai | | G02B 6/0055 362/608 |
| 2007/0159848 A1 * | 7/2007 | Yang | | G02B 6/0016 362/608 |
| 2008/0043171 A1 * | 2/2008 | Takahashi | | G02B 6/0083 349/65 |
| 2008/0159693 A1 * | 7/2008 | Chang | | G02B 6/0028 385/31 |
| 2009/0059127 A1 * | 3/2009 | Nakamoto | | G02B 6/002 349/65 |
| 2011/0013418 A1 * | 1/2011 | Kanade | | G02B 6/0028 362/606 |
| 2014/0185321 A1 * | 7/2014 | Chang | | G02B 6/002 362/611 |

\* cited by examiner

LIGHT GUIDE PLATE AND BACKLIGHT UNIT INCLUDING THE SAME

RELATED APPLICATIONS

This application claims the benefit of priority of U.S. Provisional Patent Application No. 62/038,723 filed on Aug. 18, 2014, and Korean Patent Application Nos. 10-2015-0045743 and 10-2015-0045744, both filed on Mar. 31, 2015. The contents of all of the above applications are incorporated by reference as if fully set forth herein.

FIELD AND BACKGROUND OF THE INVENTION

The present invention relates to a light guide plate and a backlight unit including the same, and more particularly, to a light guide plate in which a serration pattern is formed on a light incident surface and a backlight unit including the same.

A backlight unit (BLU) is a kind of a light source device supplying light to a rear surface of a screen of a liquid crystal display device, and is an important component which directly affects image quality such as a luminance of an image, color reproduction, a viewing angle, a contrast range, readability, etc., power consumption, a product lifetime, etc., and also accounts for about 20 to 50% of the total cost of the liquid crystal display device.

The BLUs are largely classified as a direct-lit type BLU and an edge-lit type BLU according to an arrangement type of a light source. The direct-lit type BLU has a light source which is located behind the screen and emits the light to the rear surface of liquid crystal panel, however, the edge-lit type BLU has a light source which is located on an edge of the screen, emits the light to the a side of the liquid crystal panel. A light guide plate guides the light to be moved in the direction of the liquid crystal panel. When comparing the direct-lit type BLU and the edge-lit type BLU, the edge-lit type BLU has an advantage in the viewpoint of a product thickness and a cost, but, the direct-lit type BLU has an advantage in the viewpoint of the luminance, the contrast range, screen uniformity, and the color reproduction, etc.

As such, since the edge-lit type BLU has the light source which is located on the edge of the screen and emits the light to the side, there is a problem in which the edge-lit type BLU has a relatively low luminance compared with the direct-lit type BLU. Accordingly, studies for improving the problem are being in progress.

SUMMARY OF THE INVENTION

The present invention is directed to providing a light guide plate in which a luminance is improved using a thickness change around a light incident surface, and a backlight unit including the same.

One aspect of the present invention provides a light guide plate including: a light output surface configured to output light to the outside; a reflective surface located a side opposite the light guide plate; and a light incident surface provided on at least one side surface among side surfaces connecting the light output surface and the reflective surface, and configured to receive incident light emitted from a light source.

A flat portion having a constant thickness may be provided in a space spaced apart from the light incident surface, and a light input portion may be formed in a space between the light incident surface and the flat portion, and a thickness of the light input portion may be changed in a range of greater than the thickness of the flat portion.

Another aspect of the present invention provides a backlight unit, including: a light source configured to output light; and a light guide plate including a body having a light incident surface located a side opposite the light source and configured to receive incident light from the light source, a light output surface which is perpendicular to the light incident surface and outputs the light to the outside, and a rear surface in a plate shape which is a surface opposite the light output surface, Here, the body may include a flat portion formed in a space spaced apart from the light incident surface and having a constant thickness, and a light input portion formed in a space between the light incident surface and the flat portion and having a thickness which is changed in a greater range than that of the flat portion.

According to the present invention, a light incident portion in which a thickness is changed in a light incident surface of a light guide plate can increase the amount of the light incident to the light guide plate, and thus the luminance of the light guide plate can be entirely improved by controlling a light path.

DESCRIPTION OF SPECIFIC EMBODIMENTS OF THE INVENTION

Figure 1:
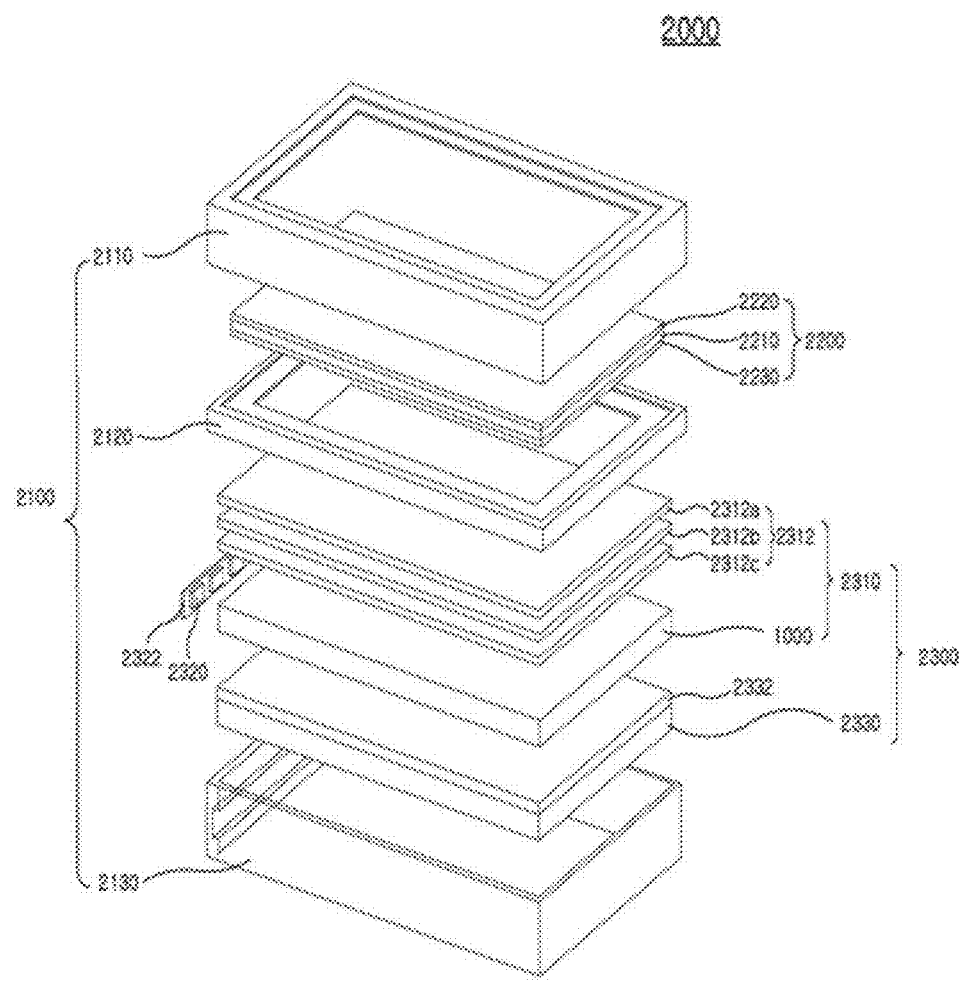
FIG. 1 is an exploded perspective view showing a liquid crystal display device according to an embodiment of the present invention.

Hereinafter, a light guide plate and a backlight unit including the same according to the embodiment of the present invention will be described in detail with reference to the accompanying drawings.

Further, the same or a similar reference numeral is given to components which are equal to or correspond to each other regardless of reference numerals shown in the drawings, a repeated description thereof will be omitted, and for convenience of explanation, a size and a shape of each component shown in the drawings may be overly expressed or reduced.

According to one aspect of the present invention, a light guide plate includes: a light output surface configured to output light to the outside; a reflective surface located a side opposite the light guide plate; and a light incident surface provided on at least one side surface among side surfaces connecting the light output surface and the reflective surface, and configured to receive incident light emitted from a light source. Further, a flat portion having a constant thickness in a space spaced apart from the light incident surface may be provided in the light guide plate, and a light input portion formed in a space between the light incident surface and the flat portion, and having a thickness changed in a range of greater than the thickness of the flat portion may be provided in the light guide plate.

Further, the light incident portion may include a first portion which is formed to be adjacent to the light incident surface and has a thickness being increased, and a second portion which is formed to be adjacent to the flat portion and has a thickness being decreased.

Moreover, the light incident portion may further include a third portion which is formed between the first portion and the second portion and has a constant thickness.

The first portion and the second portion may be connected in the light incident portion.

A length of the first portion may be smaller than that of the second portion.

An absolute value of a thickness change rate of the first portion may be greater than that of the second portion.

A thickness of the light incident surface may be greater than that of the flat portion, and a thickness change rate of the first portion may be smaller than that of the second portion.

An amount of light incident from the light source may be increased as the light incident surface is provided to have a greater thickness than the flat portion.

Light is incident to the light incident surface and a surface of the first portion and an amount of light incident from the light source may be increased.

A thickness of the light incident surface may be changed by curves formed in both sides of each of the light output surface and the reflective surface.

The light incident surface may be provided only in any one side surface of the plurality of side surfaces, and the light incident surface may be formed in one end portion of the light guide plate to correspond to the light incident surface, and the flat portion may be formed in a space between the light incident portion and a side surface opposite the any one side surface.

The light incident surface may be provided on each of a pair of facing side surfaces among the plurality of side surfaces, and the light incident surface may be formed in both end portions of the light guide plate to correspond to each of the pair of light incident surfaces, and the flat portion may be formed in a center portion of the light guide plate to connect the pair of light incident surfaces.

The light incident surface may be provided so that an increase and decrease in a thickness thereof is repeated along a direction of a width thereof.

A serration pattern which is repeatedly formed in the direction of the width, and has repeated intervals corresponding to repeated intervals of the increase and decrease in the thickness of the light incident surface may be formed on the light incident surface.

The light incident surface may be formed so that a thickness of a concave portion of the serration pattern is greater than a thickness of a convex portion of the serration pattern.

The thickness in the light incident surface may be decreased from the concave portion toward the convex portion.

The thicknesses of the concave portion and the convex portion in the light incident surface may be greater than an average thickness of the light guide plate.

After the thickness may be increased from the light incident surface along a direction perpendicular to the light incident surface, the thickness may be again decreased.

A border line of the light input portion and the flat portion may be formed in a shape corresponding to a shape of the serration pattern when viewed in a direction perpendicular to the light output surface.

A distance from the light incident surface to the border line when viewed in the direction perpendicular to the light output surface may be formed so that a distance from the concave portion is greater than that from the convex portion.

According to another aspect of the present invention, a backlight unit, includes: a light source configured to output light; and a light guide plate including a body having a light incident surface located a side opposite the light source and configured to receive incident light from the light source, a light output surface which is perpendicular to the light incident surface and outputs the light to the outside, and a rear surface in a plate shape which is a surface opposite the light output surface.

Here, the body may include a flat portion formed in a space spaced apart from the light incident surface and having a constant thickness, and a light input portion formed in a space between the light incident surface and the flat portion and having a thickness which is changed in a range of greater than the thickness of the flat portion.

The light incident surface may be provided so that an increase and decrease in a thickness thereof is repeated along a direction of a width thereof.

Hereinafter, a liquid crystal display device 2000 according to an embodiment of the present invention will be described.

Figure 2:
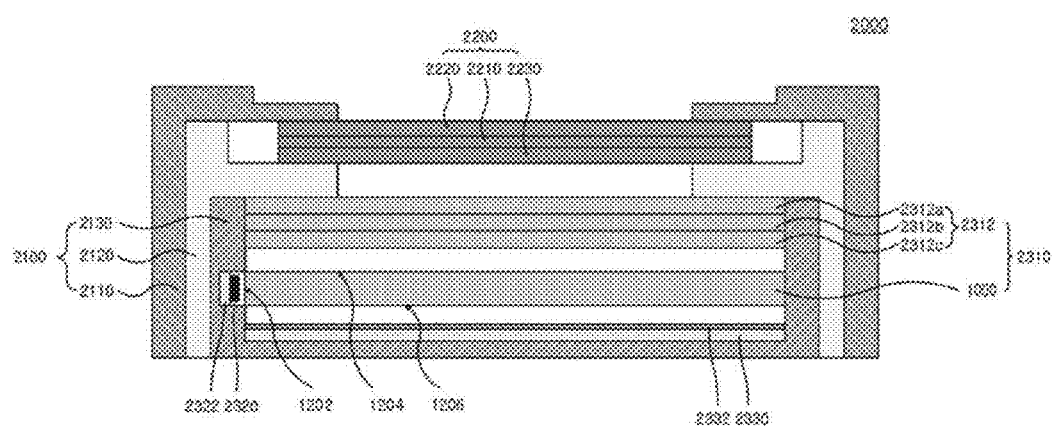
FIG. 2 is a cross-sectional view showing the liquid crystal display device according to the embodiment of the present invention.

FIG. 1 is an exploded perspective view showing the liquid crystal display device 2000 according to the embodiment of the present invention, and FIG. 2 is a cross-sectional view showing the liquid crystal display device 2000 according to the embodiment of the present invention.

Referring to FIGS. 1 and 2, a liquid crystal display device 2000 may include a housing 2100, a display panel 2200, and a backlight unit 2300.

The housing 2100 includes the display panel 2200 and the backlight unit 2300 therein and protect them from external impacts. Further, the housing 2100 serves to connect the display unit 2200 and the backlight unit 2300.

The housing 2100 may include a top case 2110, a guide frame 2120, and a bottom case 2130. The top case 2110 and the bottom case 2130 may be coupled to cover the front and back surfaces of the liquid crystal display device 2000, and a guide frame 2120 may be installed between the top case 2110 and the bottom case 2130.

Here, the display panel 2200 may be fixed by being inserted between the top case 2110 and the guide frame 2120, and the backlight unit may be fixed by being inserted between the bottom case 2130 and the guide frame 2120. At this time, the guide frame 2120 may couple the display panel 2200 and the backlight unit 2300.

The display panel 2200 may display an image using the light emitted from the backlight unit 2300.

The display panel 2200 may include two transparent substrates 2220 and 2230, and a liquid crystal layer 2210 interposed therebetween. Here, the transparent substrates 2220 and 2230 may be a thin film transistor (TFT) substrate 2220 and a color filter substrate 2230, respectively.

The orientation of the liquid crystal layer 2210 may be changed according to an electric signal, and thus the liquid crystal layer 2210 may display an image in units of pixels by performing a function of selectively transmitting the light emitted from the backlight unit 2300.

The thin film transistor substrate 2220 may control whether to transmit the light by providing the electric signal to the liquid crystal layer 2210. In detail, here, a plurality of gate lines and a plurality of data lines crossing the plurality of gate lines may be formed in the thin film transistor substrate 2220, and thus the thin film transistor may be formed in an intersection of the gate line and the data line. Here, each thin film transistor may correspond to a pixel of the liquid crystal display device 2000, and the orientation of the liquid crystal layer 2210 may be controlled according to an on/off of the transistor in order to display the image. The thin film transistor substrate 2220 is made by, for example, a twisted nematic (TN) method, an in plane switching (ISP) method, and a vertical alignment (VA) method, etc., but the thin film transistor substrate 2220 of the present invention is not limited to the example described above.

The color filter substrate 2230 may color the light passed through the liquid crystal layer 2210. The color filter substrate 2230 may include color filters with red, green, and blue (RGB) colors corresponding to each pixel, a black matrix a gate line, a data line, and the thin film transistor, and a common electrode covering the entire substrate.

A panel driving unit (not shown) for applying a scan signal to the gate line and a data signal to the data line may be provided in an edge of the display panel 2200. The panel driving unit (not shown) may be provided in a form of a printed circuit board (PCB), and be electrically connected to the gate line and the data line using a chip-on-film (COF) (not shown). However, the panel driving unit (not shown) may not be necessarily provided in the form of the PCB, and be provided as a tape carrier package (TCP) instead of the COF (not shown).

The backlight unit 2300 may emit the light to the rear surface of the display panel 2200 and allow the display panel 2200 to display the image.

The backlight unit 2300 may include optical sheets 2310, a light source 2320, and a reflective plate 2332.

The optical sheet 2310 may be arranged in the rear of the display panel 2200 and face the display panel 2200. The optical sheet 2310 may be arranged in a method in which one or more sheets are stacked. Preferably, the number of the optical sheets 2310 may be in a range of three to five. Here, the optical sheet 2310 may include a light guide plate 1000, a diffusion sheet, or a prism sheet. According to an embodiment, the optical sheet 2310 may include a vertical prism panel 2312a, a horizontal prism panel 2312b, a diffusion sheet 2312c, and a light guide panel (LGP) 1000 which are sequentially arranged from the display panel 2200 shown in FIGS. 1 and 2. However, every optical sheet 2310 is not necessary to be used or arranged according to the order described above.

The light source 2320 may emit the light projected in a rear surface of the display panel 2200. When the backlight unit 2300 is the edge-lit type, the light source 2320 may be arranged to be parallel to the light guide plate 1000. In detail, a side surface substrate 2322 may be arranged to face one side surface of the light source 2320, and the light source 2320 may be installed on the side surface substrate 2322. The light source 2320 may be arranged in parallel on the side surface substrate 2322. The light source 2320 may be provided in a form such as a cold cathode fluorescent lamp (CCFL), an external electrode fluorescent lamp (EEFL), or a light emitting diode (LED).

The reflective plate 2332 may be arranged to face the display panel 2200, and the optical sheets 2310 may be located between the reflective plate 2332 and the display panel 2200. According to an embodiment, as shown in FIGS. 1 and 2, the reflective plate 2332 may be formed on a lower substrate 2330 attached to the bottom case 2130. The reflective plate 2332 may reflect the light emitted to a rear surface of the light guide plate 1000 to the display panel 2200. Accordingly, the entire luminance of the display panel can be improved since a light loss is reduced.

Hereinafter, overall functions of the backlight unit 2300 described above will be described in brief.

First, the light source 2320 may emit light. When the light source 2320 has the form of the CCFL or the EEFL, the light may be emitted in a form of a linear light source, and when the light source 2320 has the form of the LED, the light may be emitted in a form of a point light source.

Next, the light guide plate 1000 may emit the light in a direction of the display panel 2200 by converting the light of the form of the point light source or the linear light source into a surface light source. The light guide plate 1000 may be provided in a material such as poly methyl methacrylate (PMMA), methyl methacrylate styrene (MS), methyl methacrylate (MMA) or glass, and a pattern for converting the form of the point light source into the form of the surface light source may be provided in an upper surface or lower surface of the light guide plate 1000. The pattern may be formed by a silk screening method or laser etching method, a deposition method, etc.

In detail, the light emitted from the light source 2320 may be incident to the light incident surface 1202 which is a side surface of the light guide plate 1000. When the light is incident to the light incident surface 1202 in the light guide plate 1000, the light may be reflected and diffused in the inside or on the surface of the light guide plate 1000, and thus the light may be emitted to the direction of the display panel 2200 in the form of the surface light source through the light output surface 1204 of the light guide plate 1000.

At this time, a portion of the light may be emitted to the reflective surface 1206 of the light guide plate 1000. When the light emitted to the reflective surface 1206 of the light guide plate 1000 is reflected by the reflective plate 2332 and is again incident to the reflective surface 1206 of the light guide plate 1000, the light may be emitted in the direction of the display panel 2200 through the light output surface 1204 through reflection and diffusion processes in the inside or on the surface of the light guide plate 1000.

The light emitted in the form of the surface light source through the light output surface 1204 of the light guide plate 1000 may be incident to the diffusion sheet 2312c. The diffusion sheet 2312c may diffuse the incident light. The diffusion sheet 2312c may disperse the incident light while the incident light is transmitted. Accordingly, the diffusion sheet 2312c may improve the uniformity of light output distribution. For example, a dark/bright pattern may be generated like a Moire phenomenon even when the light output to the light output surface 1204 of the light guide plate 1000 has the form of the surface light source, and in this case, the diffusion sheet 2312c may remove and reduce the dark/bright pattern.

The prism sheets 2312a and 2312b may control the light path in a direction perpendicular to the display panel 2200. The light passed through the light guide plate 1000 or the diffusion sheet 2312c may dispersed and proceed in a forward direction, and the prism sheets 2312a and 2312b may emit the dispersed light in the direction perpendicular to the display panel 2200. Accordingly, the luminance of the liquid crystal display device 2000 can be improved.

In some cases, another diffusion sheet may be arranged on the prism sheets 2312a and 2312b. Generally, a viewing angle may be narrowly formed since the light passing through the prism sheets 2312a and 2312b progresses in a vertical direction, but can be improved while again passing through the diffusion sheet.

Hereinafter, the light guide plate 1000 according to an embodiment of the present invention will be described in detail.

Figure 3:
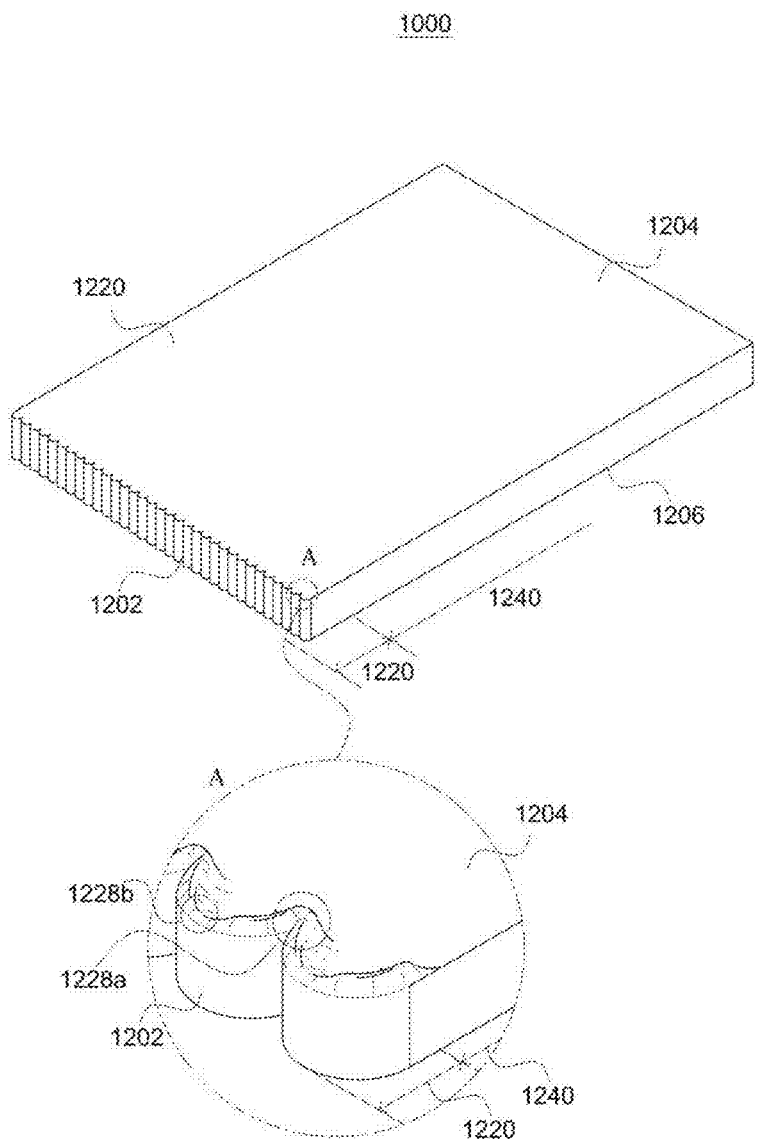
FIG. 3 is a perspective view showing the light guide plate according to the embodiment of the present invention.
Figure 4:
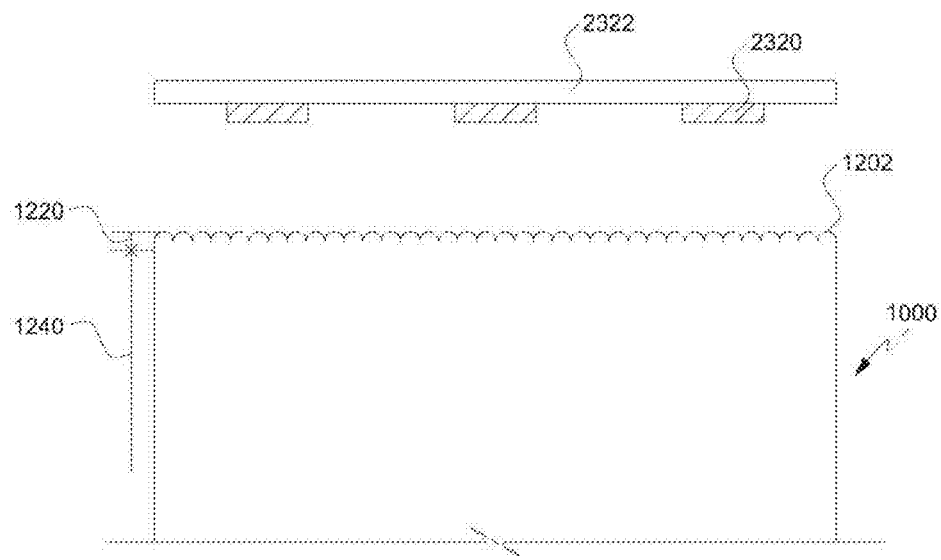
FIG. 4 is a schematic diagram showing a light incident portion of the light guide plate according to the embodiment of the present invention.

FIG. 3 is a perspective view showing the light guide plate 1000 according to the embodiment of the present invention, and FIG. 4 is a schematic diagram showing a light incident portion 1220 of the light guide plate 1000 according to the embodiment of the present invention.

Referring to FIGS. 3 and 4, a body 1200 of the light guide plate 1000 may be entirely formed in a plate form. The light guide plate 1000 may be configured as a pair of primary surfaces and four side surfaces connecting the pair of primary surfaces.

The pair of primary surfaces may include the light output surface 1204 facing the display panel and outputting the light, and the reflective surface 1206 facing the light output surface 1204 and reflecting the light. The light incident surface 1202 which is arranged to face the light source 2320 and receives incident light may be arranged in one or more side surfaces of the side surfaces.

The light output surface 1204 may perform a function of outputting the light incident through the light incident surface 1202. Although not shown, a light guide pattern may be formed in the light output surface 1204 so that the light incident from the light incident surface 1202 is diffused to the entire light guide plate 1000. The light guide pattern may be provided as a form such as a lenticular lens or a triangle or polygonal prism, and the light guide pattern may be formed to extend along a longitudinal direction of the light guide plate 1000. At this time, the light guide pattern may be repeatedly formed along a direction of a width of the light guide plate 1000 so that the light is diffused entirely.

The reflective surface 1206 may perform a function of reflecting the light incident to the light incident surface 1202 to the light output surface 1204. Although not shown, a reflective pattern may be formed in the reflective surface 1206 in order to prevent the light incident to the light incident surface 1202 from escaping to the lower surface of the light guide plate 1000 and increase the entire luminance of the light guide plate 1000. The reflective pattern may be formed to have a dot pattern, a prism pattern, and by a reflective member (a silk screening), etc. The reflective pattern may be formed to extend along the direction of the width of the light guide plate 1000, and be formed to have a predetermined interval along the longitudinal direction of the light guide plate 1000. Meanwhile, when the reflective pattern is a micro pattern, it may be possible to continuously form the micro pattern again with the predetermined interval after continuously forming the micro pattern. Further, when the reflective pattern is the triangle prism pattern, a gradient of a portion in which the incident light first reaches may be formed to be greater than a gradient of a portion facing the portion in which the incident light first reaches.

The light incident surface 1202 may be arranged to face the light source 2320 as a surface to which the light emitted from the light source 2320 is incident. A serration pattern 1228 may be formed in the light incident surface 1202 in order to expand a distribution angel in which the incident light is dispersed inside the light guide plate 1000. The serration pattern 1228 of the light incident surface 1202 may be formed as a concave portion 1228a and a convex portion 1228b. For example, the serration pattern 1228 may have various shapes such as a wave shape, a shape of a convex lens or a concave lens, or a wedge shape. The serration pattern 1228 may be formed to expand along the direction of the thickness of the light guide plate 1000, and be repeatedly formed along the direction of the width of the light guide plate 1000.

Meanwhile, other side surfaces excluding the light incident surface 1202 may be covered by a reflective tape (not shown) in order to prevent the incident light from escaping through the side surfaces.

As described above, the body 1200 of the light guide plate 1000 provided in the plate form having the pair of primary surfaces and the side surfaces may be divided into the light incident portion 1220 and the flat portion 1240.

Here, the light incident portion 1220 may a portion which is extended from the light incident surface 1202 in the body 1200 of the light guide plate 1000 to a predetermined distance, and the flat portion 1240 may be a portion excluding the light incident portion 1220.

As one example, when the light guide plate 1000 has a one-horizontal type or a one-vertical type which is a single bar type according to an arrangement of the light source 2320, only one side surface among the side surfaces of the body 1200 may be used as the light incident surface 1202, and thus the light incident portion 1220 may also be formed only in an end portion in which the light incident surface 1202 is present in the body 1200 and the flat portion 1240 may be formed from the light incident portion 1220 to the side surface opposite the light incident surface 1202. As another example, when the light source 2320 has a two-horizontal type or a two-vertical type which is a double bar type, the pair of side surfaces facing each other among the side surfaces of the body 1200 may be used as the light incident surface 1202, and thus the light incident portion 1220 may be formed in both end portions facing each other in the body 1200 and the flat portion 1240 may be formed between the light incident portions 1220.

That is, the body 1200 may have classified in the order of the light incident portion 1220 and the flat portion 1240 from the light incident surface 1202 in the light guide plate 1000 used in the single light source 2320, and the body 1200 may be classified in the order of the light incident portion 1220, the flat portion 1240, and the light incident portion 1220 from the light incident surface 1202 in the light guide plate 1000 used in both light sources.

The light incident portion 1220 may be provided to have a thickness which is changed. On the other hand, the flat portion 1240 may be provided to have a thickness which is constant. Accordingly, the light incident portion 1220 may effectively guide the light to the inside of the light guide plate 1000 by refracting the path of the light incident through the light incident surface 1202. In other words, the light incident portion 1220 may perform a function of reflecting, scattering, or diffusing the light to the entire light guide plate 1000 by receiving the light incident from the light source 2320 through the light incident surface 1202. The flat portion 1240 may reflect the light reflected, refracted, and diffused in the light incident portion 1220 by the reflective surface 1206 to guide the light to the light output surface 1204, or directly guide the light from the light incident portion 1220 to the light output surface 1204.

Meanwhile, an average thickness of the light incident portion 1220 may be provided to be equal to or greater than a thickness of the flat portion 1240. Accordingly, the light incident portion 1220 may receive a large amount of the light from the light source 2320 through the great area of the light incident portion 1220.

Figure 5:
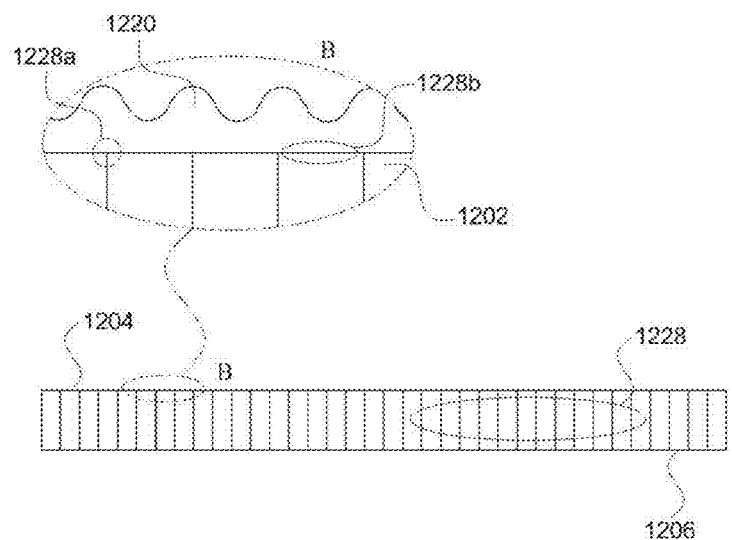
FIG. 5 is a schematic diagram showing a light incident surface of the light guide plate according to the embodiment of the present invention.
Figure 6:
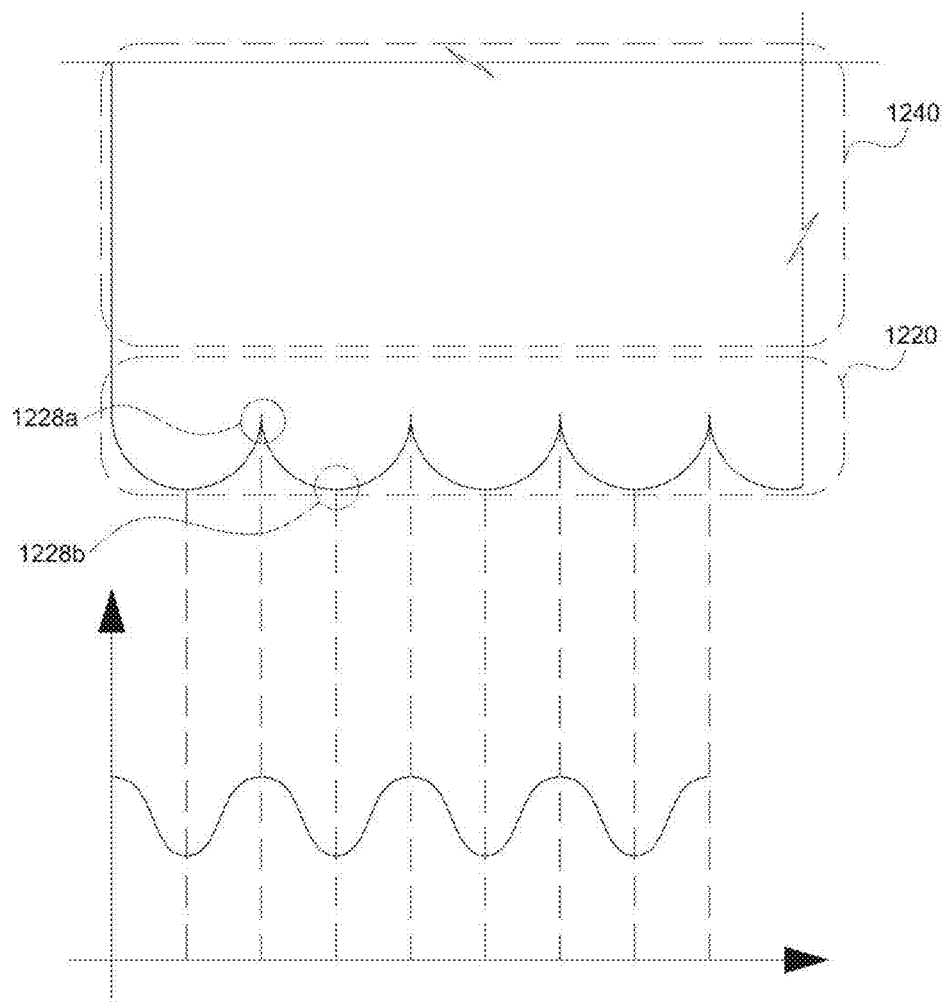
FIG. 6 is a graph showing a thickness of the light incident surface shown in FIG. 5.

FIG. 5 is a schematic diagram showing the light incident surface 1202 of the light guide plate 1000 according to the embodiment of the present invention, and FIG. 6 is a graph showing a thickness the a light incident surface 1202 shown in FIG. 5.

Referring to FIG. 5, the light incident surface 1202 may have the body 1200 in which a thickness is repeatedly increased and decreased along the direction of the width of the light incident surface 1202. Intervals in which the increase and the decrease of the thickness of the body 1200 are repeated may correspond to a pattern in which the concave portion 1228a and the convex portion 1228b of the serration pattern 1228 are repeated.

The thickness of the light incident surface 1202 in the concave portion 1228a of the serration pattern 1228 may be formed to be greater than that of the light incident surface 1202 in the convex portion 1228b of the serration pattern 1228. The thickness of the light incident surface 1202 may be decreased from the concave portion 1228a toward the convex portion 1228b. At this time, the thickness of the light incident surface 1202 in the concave portion 1228a and the convex portion 1228b may be formed to be greater than the average thickness of the light incident portion 1220 and the flat portion 1240.

Referring to FIGS. 5 and 6 again, the thickness of the light incident surface 1202 may be formed to be the greatest in the concave portion 1228a, and be formed to be the smallest in the convex portion 1228b. The thickness of the light incident surface 1202 may be decreased from the concave portion 1228a toward the convex portion 1228b, and after this, may be increased from the convex portion 1228b toward the concave portion 1228a.

At this time, a shape of the light incident surface 1202 increased in the concave portion 1228a and the convex portion 1228b may be changed according to a shape of the serration pattern 1228. For example, a first pattern in which the convex portion 1228b having a semicircle shape is repeated and the concave portion 1228a is formed at a position in contact with the convex portions 1228b, and a second pattern in which the convex portion 1228b having the semicircle shape and the concave portion 1228a symmetrical to the convex portion 1228b are repeatedly formed will be compared and described.

The second pattern may have a shape in which the convex portion 1228b and the concave portion 1228a are symmetrical, and when the concave portion 1228a is formed to have a round shape, a pressure may be uniformly distributed to the entire concave portion 1228a. Accordingly, the light incident surface 1202 formed by being extended from the second pattern may have a small curved wave shape. On the other hand, in the first pattern corresponding to the pattern described in the present invention, the pressure may be focused in the middle of the concave portion 1228a since the pressure applied to a portion in which the concave portion 1228a which is stiffly concave is formed becomes strong when forming the serration pattern 1228. Accordingly, the light incident surface 1202 extended from the concave portion 1228a may have a greater thickness than the light incident surface 1202 extended from the convex portion 1228b. The light incident surface 1202 formed by being extended from the first pattern may have a great curved wave shape.

On the other hand, the serration pattern 1228 may be provided with a pattern in which the concave portion 1228a having the semicircle shape is repeated and the convex portion 1228b is formed at a position in contact with the concave portions 1228a, or in a shape in which a triangle groove is repeated. Accordingly, the thickness of the light incident portion 1220 may be changed to correspond to various thicknesses of the serration pattern 1228.

Figure 7:
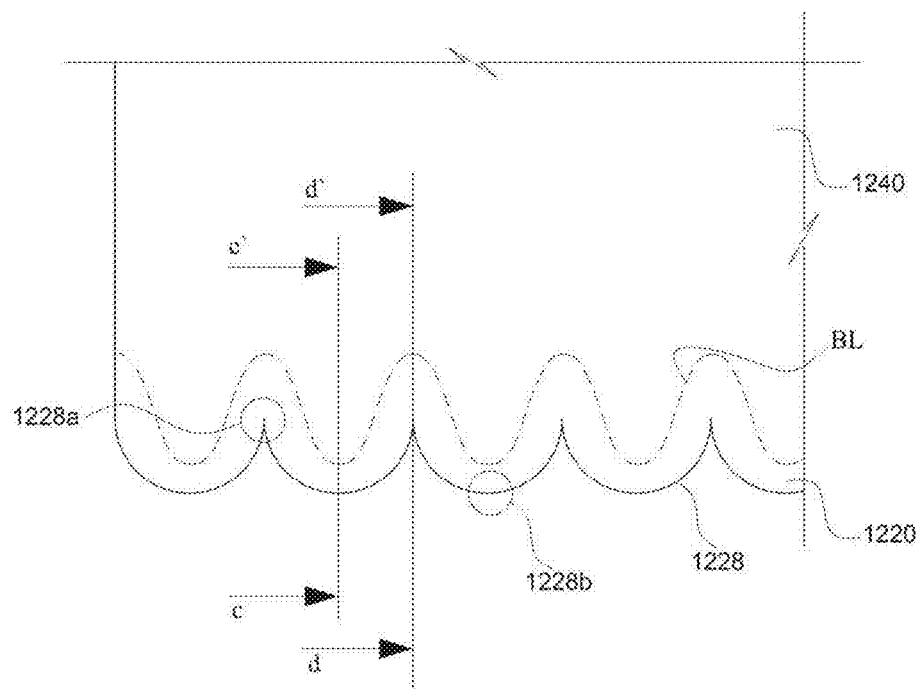
FIG. 7 is a diagram showing a border line of a light incident portion and a flat portion of the light guide plate according to the embodiment of the present invention.
Figure 8:
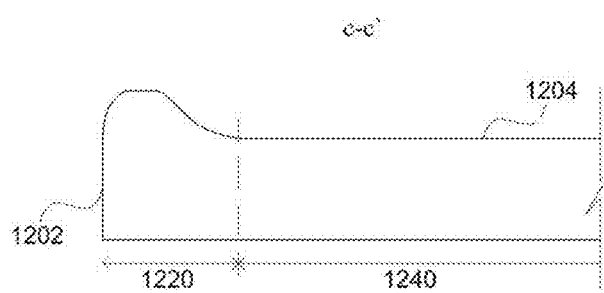
FIGS. 8 and 9 are cross-sectional views showing the light incident portion shown in FIG. 7.
Figure 9:
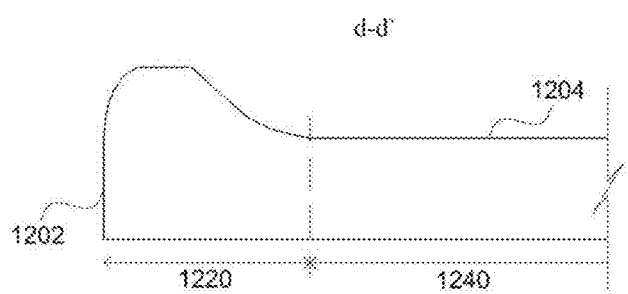

FIG. 7 is a diagram showing a border line BL of a light incident portion 1220 and a flat portion 1240 of the light guide plate 1000 according to the embodiment of the present invention, and FIGS. 8 and 9 are cross-sectional views showing the light incident portion 1220 shown in FIG. 7.

Referring to FIG. 7, the body 1200 may include a light incident portion 1220 which is adjacent to the light incident surface 1202 along a direction perpendicular to the light incident surface 1202 and has a thickness which is changed, a flat portion 1240 which is spaced apart from the light incident surface 1202 and has a constant thickness, and a border line BL formed between the light incident portion 1220 and the flat portion 1240.

The light incident portion 1220 may be a portion adjacent to the light incident surface 1202, and a thickness of the body 1200 may be changed. The thickness of the body 1200 in the light incident portion 1220 may be decreased after being increased from the light incident surface 1202 along the direction perpendicular to the light incident surface 1202. At this time, the serration pattern 1228 including the concave portion 1228a and the convex portion 1228b may be formed in the light incident surface 1202, and when viewed in the direction of the light output surface 1204, a distance between the light source 2320 and the concave portion 1228a may be greater than that between the light source 2320 and the convex portion 1228b. Accordingly, a position in which the thickness of the body 1200 is decreased after being increased from the light incident surface 1202 and becomes similar to that of the flat portion 1240 may be gradually far away from the light source 2320 from the convex portion 1228*b* toward the concave portion 1228*a*. In detail, a portion in which the thickness of the body 1200 increased in the concave portion 1228*a* is decreased may be longer than a portion in which the thickness of the body 1200 increased in the convex portion 1228*b* is decreased. That is, since the thickness of the light incident surface 1202 increased in the concave portion 1228*a* is greater than that of the light incident surface 1202 increased in the convex portion 1228*b*, a distance in which the thickness of the body 1200 is decreased becomes great.

The flat portion 1240 may be arranged to be connected to the light incident portion 1220, and be a portion in which the thickness of the body 1200 is constantly maintained. The flat portion 1240 may correspond to a remaining portion excluding the light incident portion 1220.

The border line BL may correspond to a border portion of the light incident portion 1220 and the flat portion 1240. A shape of the border line BL may be formed to be changed according to the serration pattern 1228. Further, the border line BL may be influenced by the change of the thickness of the light incident portion 1220. In more detail, the border line BL may be a line connecting positions in which the thicknesses of the concave portion 1228*a* and the convex portion 1228*b* are increased and decreased in the direction perpendicular to the light incident surface 1202 and become similar to the thickness of the flat portion 1240. Accordingly, a distance of the border line BL and the light incident surface 1202 may be decreased from the concave portion 1228*a* toward the convex portion 1228*b*, and after this, be again increased from the convex portion 1228*b* toward the concave portion 1228*a*.

Referring to FIGS. 8 and 9, a cross-section of the light incident portion 1220 in the convex portion 1228*b* and a cross-section of the light incident portion 1220 in the concave portion 1228*a* may be compared.

First, the thickness of the light incident surface 1202 in the convex portion 1228*b* may be smaller than that of the light incident surface 1202 in the concave portion 1228*a*. Accordingly, the thickness of the light incident portion 1220 extended from the light incident surface 1202 in the convex portion 1228*b* may be smaller than that of the light incident portion 1220 extended from the light incident surface 1202 in the concave portion 1228*a*. The thickness of the light incident portion 1220 increased may be decreased until the thickness of the light incident portion 1220 becomes similar to the thickness of the flat portion 1240. At this time, since the thickness of the light incident portion 1220 increased in the concave portion 1228*a* is greater than the thickness of the light incident portion 1220 increased in the convex portion 1228*b*, a distance decreased until the thickness of the light incident portion 1220 becomes similar to that of the flat portion 1240 may be greater than that decreased in the convex portion 1228*b*.

Figure 10:
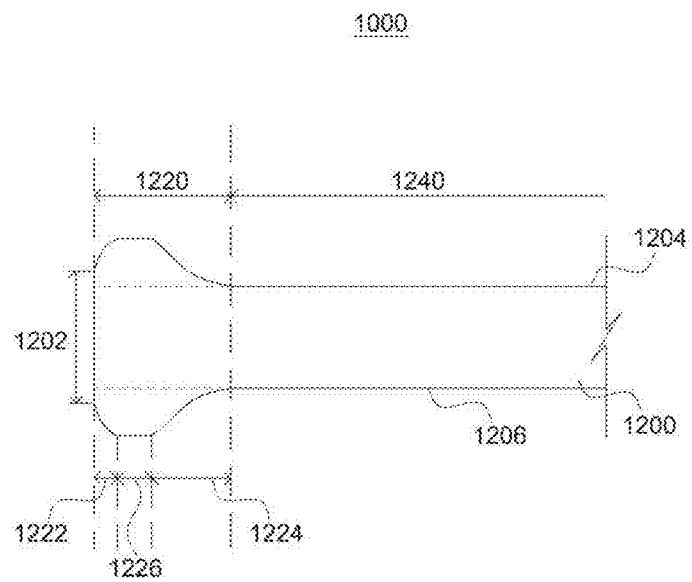
FIG. 10 is a cross-sectional view showing an example in which a light incident portion of a light guide plate is cut in a direction perpendicular to a light incident surface according to an embodiment of the present invention.
Figure 11:
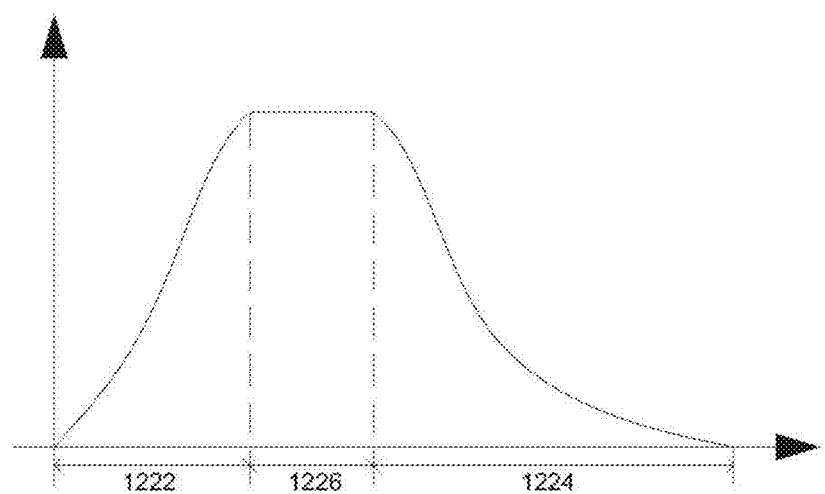
FIG. 11 is a graph showing a thickness of the light incident portion shown in FIG. 10.

FIG. 10 is a cross-sectional view showing an example in which a light incident portion 1220 of a light guide plate 1000 is cut in a direction perpendicular to a light incident surface, and FIG. 11 is a graph showing a thickness of the light incident portion 1220 shown in FIG. 10.

Referring to FIG. 10, the light incident portion 1220 may include a first portion 1222, a second portion 1224, and a third portion 1226. The portions 1222, 1224, and 1226 may be sequentially arranged in the order of the first portion 1222, the third portion 1226, and the second portion 1224 from the light incident surface 1202.

The first portion 1222 may be the closest portion to the light incident surface 1202 in the light incident portion 1220, and be a portion which is directly connected to the light incident surface 1202. The thickness of the body 1200 may be increased by being far away from the light incident surface 1202 in the first portion 1222.

The second portion 1224 may be the farthest portion from the light incident surface 1202 in the light incident portion 1220, and be a portion connected to the flat portion 1240. The thickness of the body 1200 may be decreased by being far away from the light incident surface 1202.

The third portion 1226 may be a portion arranged between the first portion 1222 and the second portion 1224. The thickness of the body 1200 may be constantly maintained in the third portion 1226. In some cases, the third portion 1226 may be omitted in the light incident portion 1220, and the first portion 1222 may be directly connected to the second portion 1224.

Referring to FIGS. 10 and 11 again, the thickness of the light incident surface 1202 may be equal to that of the flat portion 1240. The light incident portion 1220 extended in the light incident surface 1202 may be connected to the flat portion 1240 when being decreased until the thickness of the body 1200 becomes equal to that of the body 1200 of the flat portion 1240 after being increased by being far away from the light incident surface 1202 and being decreased.

The light incident portion 1220 may be arranged so that the first portion 1222 which is the closest portion to the light incident surface 1202, the second portion 1224 which is the farthest portion from the light incident surface 1202 and is connected to the flat portion 1240, and the third portion 1226 arranged between the first portion 1222 and the second portion 1224 are connected.

At this time, a distance of the first portion 1222 may be smaller than that of the second portion 1224. A thickness change rate of the body 1200 in the first portion 1222 may be greater than that of the body 1200 in the second portion 1224. That is, a gradient in the first portion 1222 may be greater than that in the second portion 1224.

In more detail, the thickness change rates of the body 1200 in the first portion 1222 and the second portion 1224 may be the same. However, since a portion in which the first portion 1222 is maintained is smaller than that in which the second portion 1224 is maintained, the thickness change rate in the first portion 1222 may be greater than that in the second portion 1224.

Further, the thickness change rates of the body 1200 in the first portion 1222 and the second portion 1224 may be the same. That is, absolute values of the thickness of the body 1200 increased in the first portion 1222 and of the thickness of the body 1200 decreased in the second portion 1224 may be the same.

Meanwhile, the body 1200 in the light incident portion 1220 may be formed to have the greatest thickness in the third portion 1226. When there is not the third portion 1226, a thickness at a position in which the first portion 1222 and the second portion 1224 are connected may be formed to be the greatest.

Figure 12:
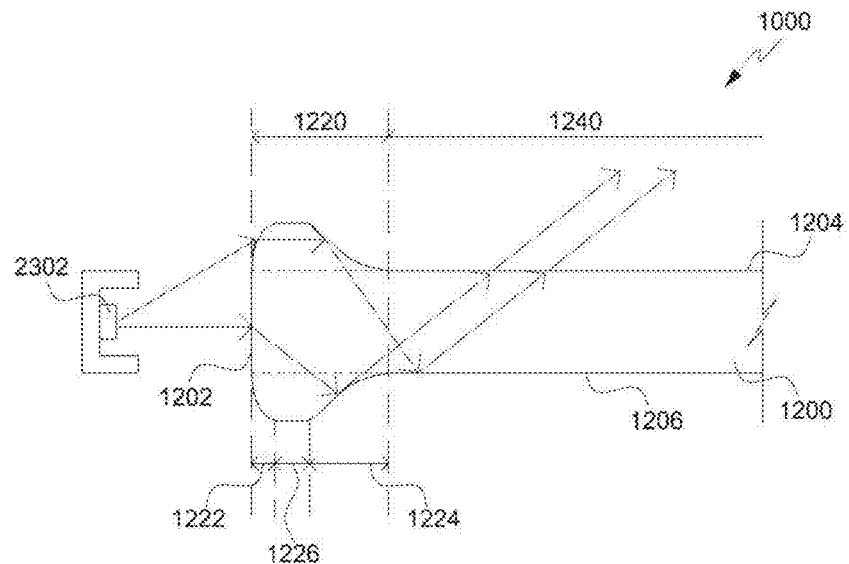
FIG. 12 is a diagram showing a light path in the light incident portion of the light guide plate shown in FIG. 10.
Figure 13:
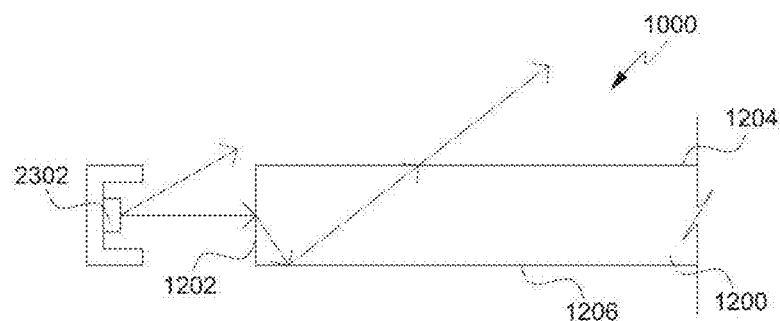
FIG. 13 is a diagram showing a light path in a light incident portion of a conventional light guide plate.

FIG. 12 is a diagram showing a light path in the light incident portion 1220 of the light guide plate 1000 shown in FIG. 10, and FIG. 13 is a diagram showing a light path in a light incident portion 1220 of a conventional light guide plate 1000.

Referring to FIG. 12, the light incident to the light incident surface 1202 may be reflected, refracted, and diffused through the light incident portion 1220, and be emitted through the light output surface 1204 after reaching the flat portion 1240.

The light projected from the light source 2320 may be incident to the first portion 1222 formed to be extended from the light incident surface 1202. The light incident to the first portion 1222 may be incident by being refracted to the third portion 1226 or the second portion 1224. The incident light may be directly reflected in the second portion 1224. Further, the incident light may be reflected in the third portion 1226, and be again reflected in the second portion 1224 after being incident to the second portion 1224. The light passed through the light incident portion 1220 may reach the flat portion 1240 by being refracted, scattered, and diffused. Finally, the light which is escaped to the lower portion of the light guide plate 1000 in the flat portion 1240 may be reflected in the reflective surface 1206 and be guided to the light output surface 1204. When the light projected from the light source 2320 is directly incident to the first portion 1222 without passing through the light incident surface 1202, an amount of the light incident to the light guide plate 1000 may be increased, and finally, the amount of the light outputting to the light output surface 1204 may be also increased and the luminance of the light output surface 1204 can be improved.

Meanwhile, the light emitted from the light source 2320 may be incident to the light incident surface 1202. The incident light may reach the flat portion 1240 by being refracted, scattered, and diffused in the light incident portion 1220 which is curved, and be guided to the light output surface 1204 by being reflected through the reflective surface 1206 or be directly guided to the light output surface 1204. At this time, since the incident light is greatly curved in the curved portion of the light incident portion 1220 and reflected by being refracted, the light can be well guided compared with when being reflected by being refracted in a flat portion.

On the other hand, referring to FIG. 13, the conventional light guide plate 1000 may not include a curved portion. The light guide plate 1000 may output the light projected from the light source 2320 through the light output surface 1204 by being incident to the light incident surface 1202 and reflecting only in the reflective surface 1206. Further, the light projected from the light source 2320 to an upward direction of the light guide plate 1000 may be disappeared without reaching the light incident surface 1202. Accordingly, the refraction, reflection, scattering, and diffusion of the light may not performed less compared with the light guide plate 1000 in which the light incident portion 1220 which is curved is formed, and the light may not be well guided to the light output surface 1204 since the amount of the light incident to the light incident surface 1202 is small.

Hereinafter, a modified example of the light guide plate 1000 will be described.

Figure 14:
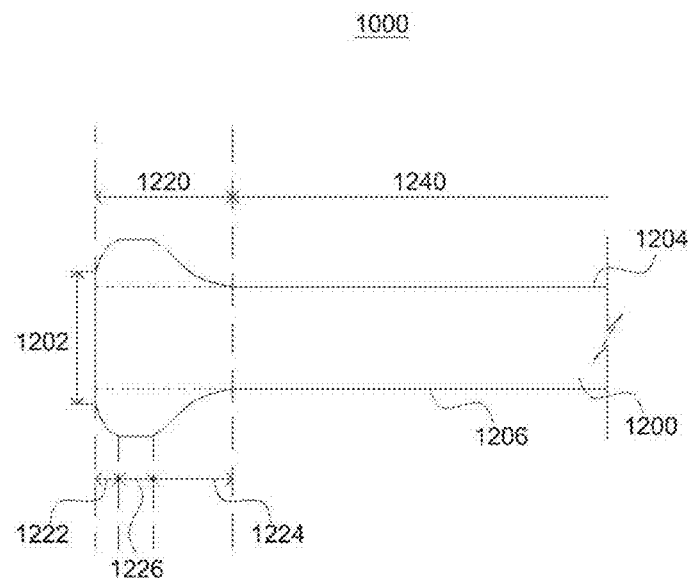
FIG. 14 is a cross-sectional view showing one modified example of the light incident plate of the light guide plate shown in FIG. 10.
Figure 15:
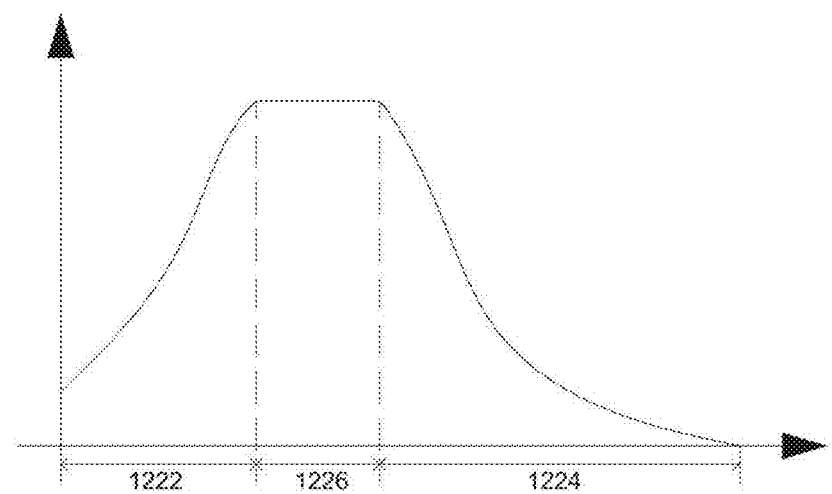
FIG. 15 is a graph showing a thickness of the light incident portion shown in FIG. 14.

FIG. 14 is a cross-sectional view showing one modified example of the light incident plate 1220 of the light guide plate 1000 shown in FIG. 10, and FIG. 15 is a graph showing a thickness of the light incident portion 1220 shown in FIG. 14.

Referring to FIGS. 14 and 15, an example in which the thickness of the light incident surface 1202 of the light guide plate 1000 is equal to that of the flat portion 1240 is illustrated, otherwise, referring to FIGS. 9 and 10, the thickness of the light incident surface 1202 may be provided to be greater than that of the body 1200 of the flat portion 1240. Since the light incident surface 1202 becomes wide, the light incident surface 1202 may receive the light more compared with a normal light incident surface 1202. The body in the first portion 1222 may be extended from the light incident surface 1202 which is great, and the thickness of the body may be again increased in a state in which the light incident surface 1202 is great. After the first portion 1222, the third portion 1226 in which the thickness of the body 1200 is constantly maintained, and the second portion 1224 in which the thickness of the body 1200 which becomes great is decreased may be formed. At this time, the third portion 1226 may be omitted, and in this case, the thickness of the body 1200 increased in the first portion 1222 may be directly decreased in the second portion 1224. The second portion 1224 may be connected to the flat portion 1240, and the thickness of the body 1200 in the second portion 1244 may be decreased until the thicknesses of the body 1200 and the flat portion 1240 become the same.

Figure 16:
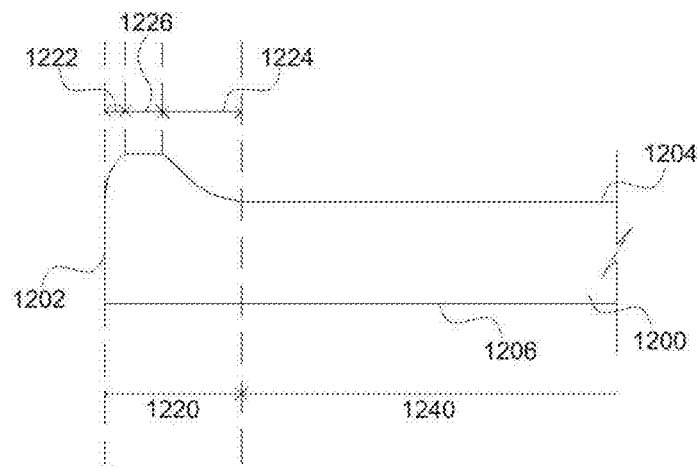
FIG. 16 is a cross-sectional view showing another modified example of the light incident plate of the light guide plate shown in FIG. 10.
Figure 17:
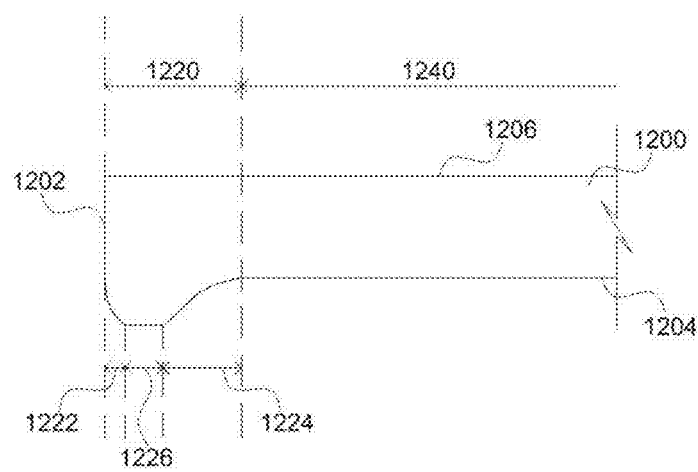
FIG. 17 is a cross-sectional view of still another modified example of the light incident plate of the light guide plate shown in FIG. 10.
Figure 18:
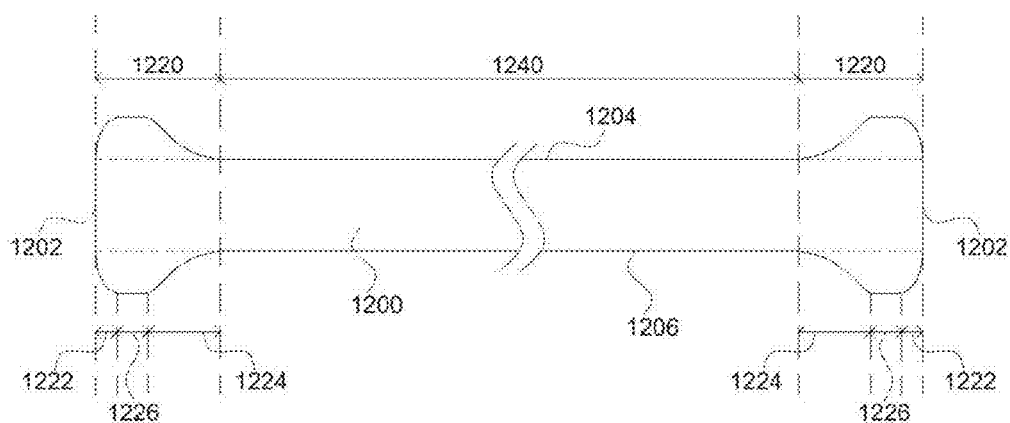
FIG. 18 is a diagram showing an example in which the light incident portion shown in FIG. 10 is formed in both sides of the light guide plate.

FIG. 16 is a cross-sectional view showing another modified example of the light incident plate 1220 of the light guide plate 1000 shown in FIG. 10, FIG. 17 is a cross-sectional view showing still another modified example of the light incident plate 1220 of the light guide plate 1000 shown in FIG. 10, and FIG. 18 is a diagram showing an example in which the light incident portion 1220 shown in FIG. 10 is formed in both sides of the light guide plate 1000.

Referring to FIGS. 16 to 18, the light incident portion 1220 of the light guide plate 1000 may be formed to protrude in a direction of the light output surface 1204 or the reflective surface 1206, or to protrude in both directions.

FIG. 16 illustrates an example in which the light incident portion 1220 of the light guide plate 1000 is formed to protrude in the direction of the light output surface 1204. When the light incident portion 1220 of the light guide plate 1000 is protruded in the direction of the light output surface 1204, the light projected from the light source 2320 in an upper direction of the light output surface 1204 may be incident to the first portion 1222. The light incident through the light incident portion 1220 may be finally guided to the light output surface 1204 by being reflected, refracted, and diffused. Accordingly, the light in which it is possible to be disappeared by being projected from the light source 2320 in an upper direction of the light output surface 1204 may be incident through the light incident portion 1220, and thus a more amount of light may be incident to the light guide plate 1000. The increase of the light incident to the light guide plate 1000 can improve the luminance of the light output surface 1204. Meanwhile, a reflective pattern may be formed in the reflective surface 1206, and the light which is escaped to the lower surface of the light guide plate 1000 may be guided to the light output surface 1204 by being reflected by the reflective pattern. Accordingly, the luminance of the light guide plate 1000 can be further improved.

Further, when the light incident portion 1220 of the light guide plate 1000 is protruded in the direction of the light output surface 1204, the diffusion sheet 2312*c* which is arranged on the light guide plate 1000 may be supported by the light incident portion 1220, and a space between the diffusion sheet 2312*c* and the light guide plate 1000 may be constantly maintained by the light incident portion 1220.

FIG. 17 illustrates an example in which the light incident portion 1220 of the light guide plate 1000 is formed to protrude in the direction of the reflective surface 1206.

When the light incident portion 1220 of the light guide plate 1000 protrudes in the direction of the reflective surface 1206, the light projected from the light source 2320 in a downward direction of the reflective surface 1206 may be incident to the first portion 1222. The light incident through the light incident portion 1220 may be finally reflected from the reflective surface 1206 to the light output surface 1204 and be guided through the light output surface 1204 by being reflected, refracted, and diffused. Accordingly, the light in which it is possible to be disappeared by being projected from the light source 2320 in the lower direction of the reflective surface 1206 may be incident through the light incident portion 1220, and thus a more amount of light may be incident to the light guide plate 1000. The increase of the amount of the light incident to the light guide plate 1000 can improve the luminance of the light output surface 1204. Meanwhile, a light guide pattern may be formed in the light output surface 1204, and the light in which it is possible to be disappeared in the light guide plate 1000 may be guided to the light output surface 1204 by the light guide pattern. Accordingly the luminance of the light guide plate 100 can be further improved.

Referring to FIG. 18, when the light incident surface 1202 is provided in the both sides of the light guide plate 1000, the light incident surface 1202 may be formed to be extended to a center portion of the light guide plate 1000 by being extended from the light incident surface 1202 located in the both sides. The flat portion 1240 may be formed between the light incident portions 1220 as the light incident portions 1220 are formed in the both sides.

Meanwhile, the body 1200 of the light incident portion 1220 may be formed to asymmetrically protrude in the upward direction and downward direction of the light guide plate 1000. Accordingly, even when a space in which the light guide plate 1000 is positioned is insufficient, it may be possible to install the light guide plate 1000.

Hereinafter, a sequence of a method of manufacturing the light guide plate 1000 according to an embodiment of the present invention will be described. A pattern forming method may be performed using a pattern forming apparatus 3000 or an apparatus which is equal to or similar to the same. However, the pattern forming method is not limited by the pattern forming apparatus 3000 which will be described hereinafter.

Figure 19:
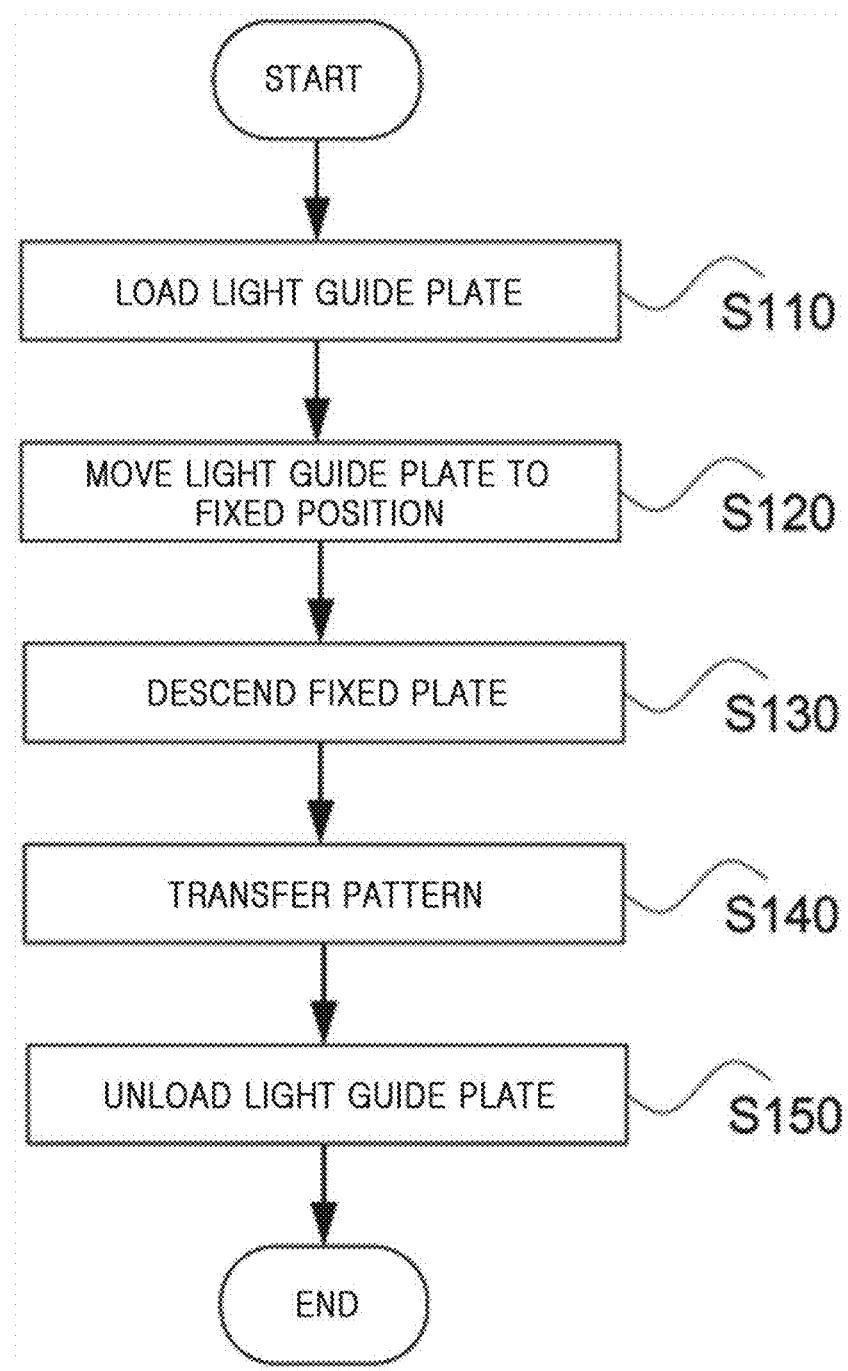
FIG. 19 is a flowchart for describing a method of manufacturing a light guide plate according to an embodiment of the present invention.

FIG. 19 is a flowchart for describing a method of manufacturing a light guide plate 1000 according to an embodiment of the present invention.

Referring to FIG. 19, the method of manufacturing the light guide plate 1000 may include loading the light guide plate 1000 (S110), moving the light guide plate 1000 to a fixed position (S120), pressurizing by contacting a fixed member 3500 to the light guide plate 1000 (S130), transferring a pattern onto the light incident surface 1202 (S140), and unloading the light guide plate 1000 (S150). Hereinafter, each operation will be described in detail. However, since each operation described above is not necessarily required, a portion of the operations may be omitted and it may be possible to perform the pattern forming method. Further, the sequence of each operation may not be equal to the sequence described above, and one operation may be simultaneously performed with another operation or it may be possible to perform the operation described later prior to the operation described before.

First, the light guide plate 1000 may be loaded into a transporter 3100 (S110). The light guide plate 1000 may be provided on a conveyer belt together with a base plate 3200 or be provided on the base plate 3200 after being previously provided on the base plate 3200.

When the light guide plate 1000 is loaded, the transporter 3100 may move the light guide plate 1000 to the fixed position (S120). Here, the fixed position means a position in which a pattern surface 3310a of the pattern transfer 3300 is able to be in contact with the light incident surface 1202 of the light guide plate 1000 by being moved by a first piston 3320. When the light guide plate 100 is located in the fixed position, the transporter 3100 may be stopped.

After the light guide plate 1000 is located at the fixed position, the fixed member 3500 may be descended to be in contact with the light guide plate 1000 (S130). The light guide plate 1000 may be fixed by the fixed member 3500 which is descended.

In this state, a pattern may be transferred onto the light incident surface 1202 (S140). First, the first piston 3320 of the pattern transfer 3300 may transfer the pattern onto the light incident surface 1202 by contacting, heating, and pressurizing the pattern surface 3310a of the pattern transfer member 3310 and the light incident surface 1202. At this time, the thickness of the light incident portion 1220 of the light guide plate 1000 may be changed since the pattern surface 3310a is pressurized. Particularly, the thickness of the light incident portion 1220 may be changed according to the shape of the serration pattern 1228, and the concave portion 1228a of the serration pattern 1228 may be further pressurized compared with the convex portion 1228b. Further, since the pressure applied to the concave portion 1228a is strong, the thickness of the light incident portion 1220 in the concave portion 1228a may be greater than that of the light incident portion 1220 in the convex portion 1228b.

When the pattern transferring is complete, the light guide plate 1000 may be unloaded (S150). The fixed plate 3510 may be ascended, the transporter 3100 may unload the light guide plate 1000 by moving the light guide plate 1000.

Hereinafter, an apparatus for forming the serration pattern 1228 used when forming the serration pattern 1228 will be described.

Figure 20:
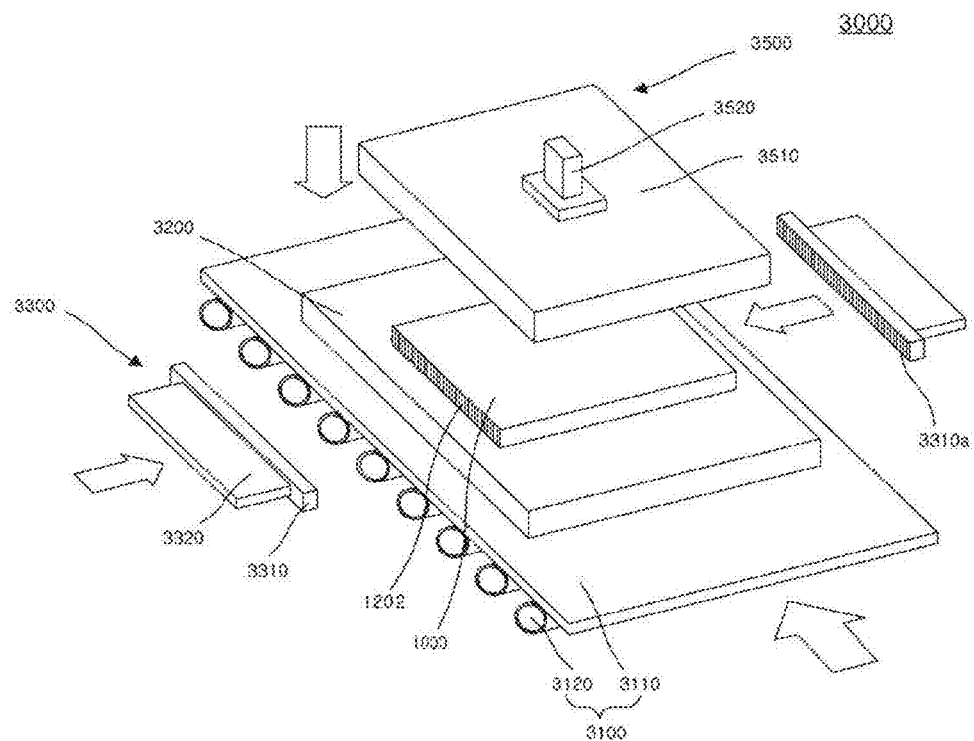
FIG. 20 is a diagram illustrating an apparatus for forming a serration pattern according to an embodiment of the present invention.
Figure 21:
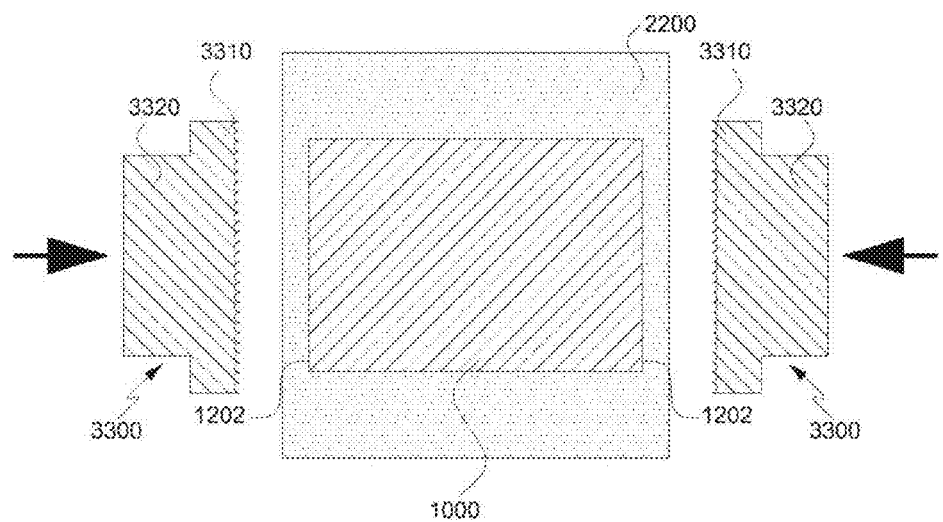
FIG. 21 is a plane view showing the apparatus for forming the serration pattern shown in FIG. 20.
Figure 22:
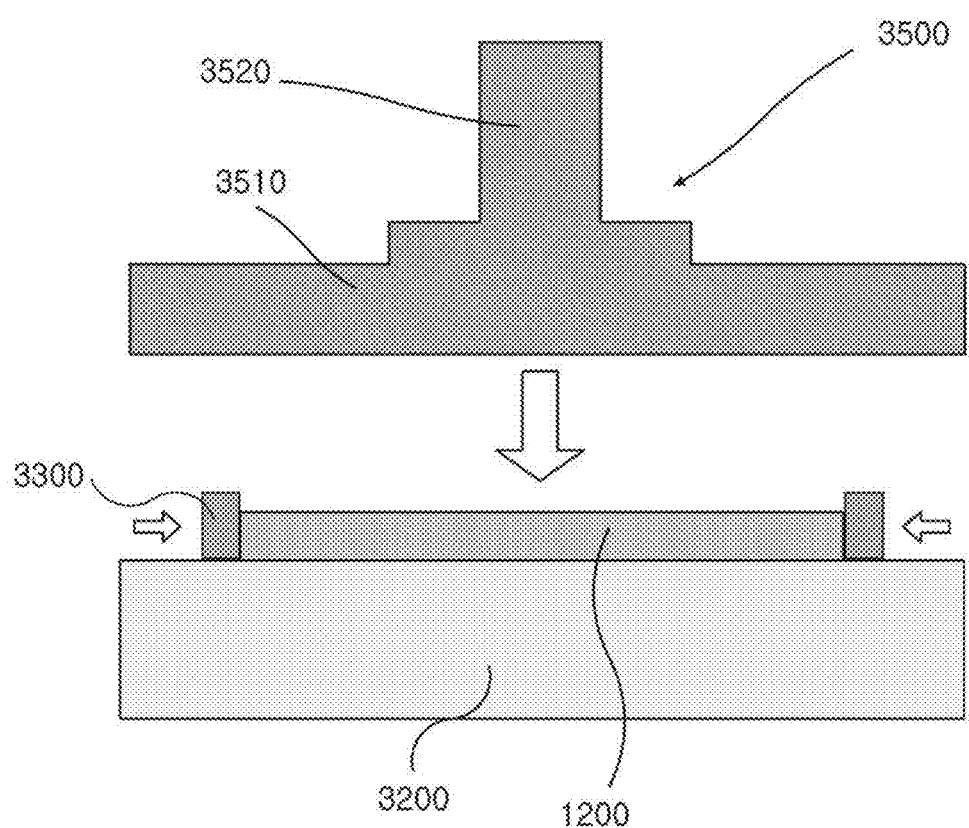
FIG. 22 is a cross-sectional view showing the apparatus for forming the serration pattern shown in FIG. 20.

FIG. 20 is a diagram illustrating an apparatus for forming a serration pattern 1228 according to an embodiment of the present invention, FIG. 21 is a plane view showing the apparatus for forming the serration pattern 1228 shown in FIG. 20, and FIG. 22 is a cross-sectional view showing the apparatus for forming the serration pattern 1228 shown in FIG. 20.

Referring to FIGS. 20 to 22, the apparatus for forming the serration pattern 1228 may include a transporter 3100, a base plate 3200, a pattern transfer 3330, and a fixed member 3500.

The transporter 3100 may move the light guide plate 1000. The light guide plate 1000 may be moved in a state placed on the base plate 3200. For example, the transporter 3100 may be configured as a conveyor belt 3110 in which the base plate 3200 is placed and a roller 3120 generating driving power to move the conveyor belt 3110. The transporter 3100 may load the light guide plate 1000 from the outside, and move the light guide plate 1000 to a fixed position for transferring the pattern onto the light guide plate which is moved, that is, a position in which the light incident surface 1202 of the light guide plate 1000 and the pattern surface 3310a of the pattern transfer 3300 are in contact with each other. When the pattern transferring is complete, the transporter 3100 may unload the light guide plate 1000 from the fixed position to the outside.

The base plate 3200 may support the light guide plate 1000. The light guide plate 1000 may be moved by the transporter in a state placed on the base plate 3200 or the pattern may be transferred onto the light guide plate 1000 from the pattern transfer 3300. The base plate 3200 may be provided as a metal material with elasticity. The base plate 3200 may be provided in a plate form having a greater area than the light guide plate 1000. Accordingly, the light guide plate 1000 may be placed on the base plate 3200.

The pattern transfer 3300 may transfer the pattern onto the light incident surface 1202 of the light guide plate 1000. The pattern transfer 3300 may include a pattern transfer member 3310 and a first piston 3320. The pattern transfer member 3310 may have a pattern surface 3310a in which an original pattern of a pattern which desires to transfer onto the light incident surface 1202 is formed. The original pattern and the pattern which desires to transfer may have a complement shape. The pattern surface 3310a may be arranged to face the light incident surface 1202 of the light guide plate 1000 located in the fixed position. The first piston 3320 may move the pattern transfer member 3310 forward or backward in the direction of the light incident surface 1202 of the light guide plate 1000. Accordingly, the pattern surface 3310a may transfer the pattern by being in contact with the light incident surface 1202.

The transferring of the pattern may be performed by at least one of methods of heating and pressurizing. In the method of pressurizing, the first piston 3320 may move the pattern surface 3310a of the pattern transfer member 3310 so as to be in contact with the light incident surface 1202, and the pattern may be transferred by transforming the light guide plate 1000 by a pressure by applying the pressure.

In the method of heating, the first piston 3320 may move the pattern surface 3310a of the pattern transfer member 3310 so as to be in contact with the light incident surface 1202, and the pattern may be transferred by transforming the light guide plate 1000 by a heat by applying the heat. Here, a heat condition may be equal to or more than a heat transformation temperature of the light guide plate 1000 in which the pattern is transcribed and be equal to or less than a heat transformation temperature of the pattern transfer member 3310 in which the original pattern is formed, and for example, it may be desirable to maintain a temperature which is from about 70° C. to 140° C. When performing the pattern transferring by the heat transformation, a heating means (not shown) for heating the pattern transfer member 3310 by the temperature according to the temperature condition described above may be added to the pattern transfer 3300. The heating means may be embedded in a form of a heater for receiving electric power inside the pattern member and generating the heat. A time of performing the heat transferring and the pressurization transferring may be set to be equal to or more than a time in which the transformation is generated in the light incident surface 1202 of the light guide plate 1000, and to be equal to or less than a time in which glass transition is generated in the center portion of the light incident surface 1202 of the light guide plate 100, and it may be desirable to perform the transferring for about 5 to 20 seconds.

The fixed member 3500 may include a fixed plate 3510 covering the upper portion of the light guide plate 1000, and a third piston 3520 escalating the fixed plate 3510 upward and downward. The third piston 3520 may pressurize to maintain the state in which the fixed plate 3510 is in contact with the light guide plate 1000 by moving the fixed plate 3510 downward while the pattern transfer 3300 pressurizes the light incident surface 1202.

The light guide plate 1000 manufactured using the method and apparatus described above may receive the large amount of light since the area of the light incident surface 1202 becomes wide, and the luminance of the light output surface 1204 can be improved since the amount of the light output to the light output surface 1204 becomes great. Further, since the light is reflected several times through the light incident portion 1220 of the light guide plate 1000, the light can be uniformly emit when the light is output to the light output surface 1204.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A light guide plate, comprising:
    a light output surface for outputting light to the outside;
    a reflective surface which is located in the opposite side of the light guide plate; and
    a light incident surface which is provided in at least one side surface among side surfaces connecting the light output surface and the reflective surface, and to which the light emitted from a light source is incident,
    wherein a flat portion having a constant thickness is provided in a space which is spaced apart from the light incident surface,
    a light input portion is formed in a space between the light incident surface and the flat portion, and a thickness of the light input portion is changed in a greater range than that of the flat portion, and
    wherein the light input portion includes a first portion which is formed to be adjacent to the light incident surface and has a thickness which is increased, and a second portion which is formed to be adjacent to the flat portion and has a thickness which is decreased.

2. The light guide plate of claim 1, wherein the light input portion is formed between the first portion and the second portion, and further includes a third portion having a constant thickness.

3. The light guide plate of claim 1, wherein the first portion and the second portion are connected in the light input portion.

4. The light guide plate of claim 1, wherein a length of the first portion is smaller than that of the second portion.

5. The light guide plate of claim 1, wherein an absolute value of a thickness change rate of the first portion is greater than that of the second portion.

6. The light guide plate of claim 1, wherein a thickness of the light incident surface is greater than that of the flat portion, and a thickness change rate of the first portion is smaller than that of the second portion.

7. The light guide plate of claim 1, wherein an amount of light which is incident from the light source is increased as the light incident surface is provided to have a greater thickness than the flat portion.

8. The light guide plate of claim 1, wherein an amount of the light which is incident from the light source is increased by being incident the light to the light incident surface and a surface of the first portion.

9. The light guide plate of claim 1, wherein a thickness of the light incident surface is changed by a curve formed in both sides of the light output surface and the reflective surface.

10. The light guide plate of claim 1, wherein the light incident surface is provided so that increase and decrease of a thickness is repeated along a direction of a width.

11. The light guide plate of claim 10, wherein a serration pattern which is repeatedly formed in the direction of the width and has a repeated interval corresponding to an interval in which the increase and decrease of the thickness of the light incident surface is repeated is formed in the light incident surface.

12. The light guide plate of claim 11, wherein the light incident surface is formed so that a thickness in a concave portion of the serration pattern is greater than that in a convex portion of the serration pattern.

13. The light guide plate of claim 12, wherein the thickness in the light incident surface is decreased while moving from the concave portion to the convex portion.

14. The light guide plate of claim 12, wherein the thicknesses of the concave portion and the convex portion in the light incident surface are greater than an average thickness of the light guide plate.

15. The light guide plate of claim 12, wherein a thickness is increased from the light incident surface along a direction perpendicular to the light incident surface, and after this, the thickness is again decreased.

16. The light guide plate of claim 12, wherein a border line of the light incident portion and the flat portion is formed to have a shape corresponding to a shape of the serration pattern when viewed in a direction perpendicular to the light output surface.

17. The light guide plate of claim 16, wherein a distance from the light incident surface to the border line when viewed in the direction perpendicular to the light output surface is formed so that a distance in the concave portion is greater than a distance in the convex portion.

18. A backlight unit, comprising:
a light source configured to output light; and
a light guide plate including a light incident surface which is located in the opposite side of the light source and to which the light from the light source is incident, a light output surface which is located in a direction perpendicular to the light incident surface and outputs the light to the outside, and a body of a plate form having a rear surface which is an opposite surface of the light output surface,
wherein the body includes a flat portion formed in a space which is spaced apart from the light incident surface and having a constant thickness, and a light input portion formed in a space between the light incident surface and the flat portion and having a thickness which is changed in a greater range than that of the flat portion, and
wherein the light input portion includes a first portion which is formed to be adjacent to the light incident surface and has a thickness which is increased, and a second portion which is formed to be adjacent to the flat portion and has a thickness which is decreased.

19. The backlight unit of claim 18, wherein the light incident surface is provided so that increase and decrease of a thickness is repeated along a direction of a width.

* * * * *